United States Patent
Cui et al.

(10) Patent No.: US 8,652,826 B2
(45) Date of Patent: Feb. 18, 2014

(54) MARINE BACTERIAL STRAINS OF CYCLOCLASTICUS AND MARINOBACTER FOR DEGRADATION OF HIGH-MOLECULAR-WEIGHT POLYCYCLIC AROMATIC HYDROCARBONS

(71) Applicants: Zhi-Song Cui, Shandong (CN); Li Zheng, Shangdong (CN); Guang-Su Xu, Shangdong (CN); Qian Li, Shangdong (CN); Wei Gao, Shangdong (CN); Fa-Rong Chen, Shangdong (CN)

(72) Inventors: Zhi-Song Cui, Shandong (CN); Li Zheng, Shangdong (CN); Guang-Su Xu, Shangdong (CN); Qian Li, Shangdong (CN); Wei Gao, Shangdong (CN); Fa-Rong Chen, Shangdong (CN)

(73) Assignee: First Institute of Oceanography State Oceanic Administration of China, Qingdao, Shandong (CN)

( * ) Notice: Subject to any disclaimer, the term of this patent is extended or adjusted under 35 U.S.C. 154(b) by 0 days.

(21) Appl. No.: 13/761,870

(22) Filed: Feb. 7, 2013

(65) Prior Publication Data
US 2013/0213882 A1      Aug. 22, 2013

(30) Foreign Application Priority Data

Feb. 20, 2012  (CN) .......................... 2012 1 0038958

(51) Int. Cl.
*A62D 3/00*           (2007.01)

(52) U.S. Cl.
USPC .................. 435/252.4; 435/252.1; 435/256.8; 435/262.5

(58) Field of Classification Search
None
See application file for complete search history.

(56) References Cited

PUBLICATIONS

First Notification of Office Action issued on Sep. 29, 2012 in corresponding Chinese Application No. CN 201210038958.0, and an English translation thereof.
Notification on the Grant for Patent Right for Invention issued on Nov. 5, 2012 in corresponding Chinese Application No. CN 201210038958.0, and an English translation thereof.

*Primary Examiner* — Blaine Lankford
(74) *Attorney, Agent, or Firm* — Buchanan Ingersoll & Rooney PC

(57) ABSTRACT

A composite marine bacterial liquid for the synergic degradation of high-molecular-weight polycyclic aromatic hydrocarbons (HMW PAHs) and the preparation method thereof. The composite marine bacterial liquid is generated by mixing the fermented culture liquid of a stain of *Cycloclasticus* sp. PY97M and a stain of *Marinobacter* sp. D15-8W, the cell concentration of each is $10^7$-$10^9$ CFU/mL. The preparation method includes: inoculating the seed liquid of *Cycloclasticus* strains and *Marinobacter* strains individually into the sodium acetate medium or M8 medium, fermenting under the condition of defoaming by flowing addition of defoamer, and mixing the fermented cultures to obtain the composite marine bacterial liquid, then preparing a 5-fold concentrated liquid by centrifuging and storing at 4° C.

5 Claims, 1 Drawing Sheet

MARINE BACTERIAL STRAINS OF CYCLOCLASTICUS AND MARINOBACTER FOR DEGRADATION OF HIGH-MOLECULAR-WEIGHT POLYCYCLIC AROMATIC HYDROCARBONS

FIELD OF THE INVENTION

The present invention relates to the field of marine environmental bioremediation technology, particularly, relates to a composite marine bacterial liquid, which is based on the synergic effect of the high-molecular-weight polycyclic aromatic hydrocarbons-degrading bacteria, and the preparation method thereof.

BACKGROUND

As an important type of ocean pollutants, persistent organic pollutants (POPs) can persistently present in marine environment, and will generate harmful effect for the health of marine organisms and human being by accumulation of food chain. High-molecular-weight polycyclic aromatic hydrocarbons (HMW PAHs) should be considered as one type of the most commonplace and important POPs. Due to the characters of high toxicity, persistence, bioaccumulation, lipophilia-hydrophobicity and hardly degradable, HMW PAHs have the effect of tri-genicity (carcinogenicity-mutagenicity-teratogenicity) and genotoxicity, and pose great threat to the marine ecological environment and human health.

Some researches indicated that, microbial degradation is one of the major pathways for removing HMW PAHs from marine environment. Since successfully applied in the bioremediation of the coast, which was polluted by the oil spill accident, in Alaska (USA) in the 90s of the twenty-century, the environment-friendly remediation technology is increasingly valued by scientists and governments of many countries.

The obligate hydrocarbonoclastic bacteria (OHCBs) are very particular microorganisms in marine environment, which have the characters as follows: firstly, high specific surface area, by which the bacteria are capable to adapt the low-nutritional condition of marine environment; secondly, the preference in hydrocarbon compounds degradation, that is, they use hydrocarbons as their sole carbon sources, wherein some of them even cannot use simple organic carbons, such as glucose; thirdly, highly efficiency and broad-spectrum catalytic activity, that is, they present the high degradation rates for different hydrocarbon compounds, such as typical HMW PAHs. The bacteria which have been reported include *Alcanivorax, Cycloclasticus, Marinobacter, Marinobacterium, Neptunomonas, Oleispira, Thalassolituus* and so on. Wherein, *Cycloclasticus* strains uniquely possess the capacity of degrading HMW PAHs, and studies show that the rates of degrading HMW PAHs can be further improved by the synergic effect between *Cycloclasticus* strains and other strains. There is a good prospect for the application of *Cycloclasticus* strains and its microflora in the remediation of marine environment which has been polluted by POPs (such as HMW PAHs). But, due to the unique growth characters of *Cycloclasticus* strains which are different from terraneous bacteria, the isolation of bacterial strain with high activity is quite difficult.

SUMMARY

The present application provides a marine bacterial liquid for the degradation of HMW PAHs and the preparation method thereof, a composite bacterial liquid which comprises marine microorganisms for the degradation of POPs (e.g. HMW PAHs and so on) and the preparation method thereof. By taking advantage of the synergic effect of different bacteria in the process of degrading HMW PAHs, two marine bacterial strains are used to prepare the HMW PAHs-degrading composite marine bacterial liquid, for the application in the bioremediation of marine environment.

The present disclosure relates to a marine bacterial liquid, which has two strains of OHCBs in it, wherein, one is *Cycloclasticus* sp. PY97M, the other is *Marinobacter* sp. D15-8W. The strains have been respectively deposited in China General Microbiological Culture Collection Center, and the deposition numbers are CGMCC No. 4339 (strain *Cycloclasticus* sp. PY97M) and CGMCC No. 5669 (strain *Marinobacter* sp. D15-8W), respectively.

Another aspect of the present disclosure relates to a composite marine bacterial liquid which is capable of synergically degrading HMW PAHs, comprising the alive bacteria of the above two bacterial strains.

In one embodiment, the cell concentration of the bacteria is $10^7$-$10^9$ CFU/mL. In another embodiment, the medium for preparing the bacterial liquid is a sodium acetate medium or M8 medium.

In a further embodiment, each liter of the sodium acetate medium comprises 22.79 g NaCl, 11.18 g $MgCl_2.6H_2O$, 3.98 g $Na_2SO_4$, 1.46 g $CaCl_2.2H_2O$, 1.30 g TAPSO, 0.72 g KCl, 0.27 g $NH_4Cl$, 89.00 mg $Na_2HPO_4.7H_2O$, 83.00 mg NaBr, 31.00 mg $NaHCO_3$, 27.00 mg $H_3BO_3$, 24.00 mg $SrCl_2.6H_2O$, 2.60 mg NaF, 2.00 mg $FeCl_2.4H_2O$, and 2 g sodium acetate; and the pH value of the medium is 7.6. This medium is used to culture strain PY97M.

In a further embodiment, each liter of the M8 medium comprises 22.79 g NaCl, 11.18 g $MgCl_2.6H_2O$, 3.98 g $Na_2SO_4$, 1.46 g $CaCl_2.2H_2O$, 1.30 g TAPSO, 0.72 g KCl, 0.27 g $NH_4Cl$, 89.00 mg $Na_2HPO_4.7H_2O$, 83.00 mg NaBr, 31.00 mg $NaHCO_3$, 27.00 mg $H_3BO_3$, 24.00 mg $SrCl_2.6H_2O$, 2.60 mg NaF, 2.00 mg $FeCl_2.4H_2O$, 2 g sodium acetate, 0.5 g peptone, 0.5 g yeast extracts, 0.5 g potato extract powder, 0.2 g glucose, 0.2 g sucrose, 0.05 g sodium malate, 0.05 g trisodium citrate, and 0.05 g potassium sodium tartrate; and the pH value of the medium is 7.8. This medium is used to culture strain D15-8W.

In an embodiment, the composite bacterial liquid is used to degrade HMW PAHs.

The composite bacterial liquid is suitable for the biodegradation of HMW PAHs pollutions at a lower environmental temperature, and has faster degradation rates. In an example, the composite bacterial liquid can degrade 83.03% of fluoranthene which has an initial concentration of 20 mg/L or 75.50% of pyrene which has an initial concentration of 20 mg/L after 3 weeks; compared to the bacterial liquid of the pure cultures, the composite bacterial liquid has higher HMW PAHs degradation rates.

Figure 1:
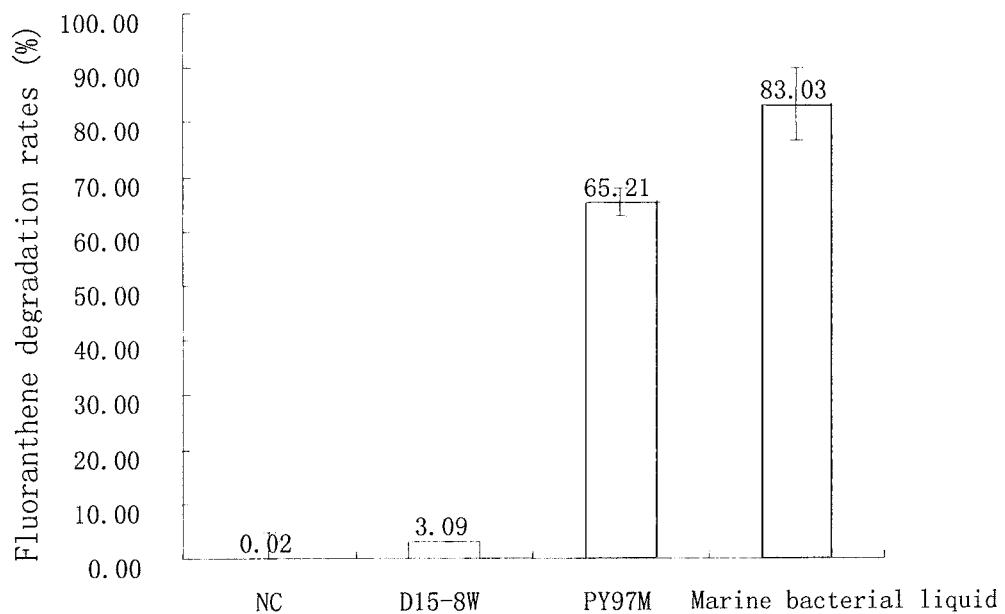
FIG. 1 is a comparison schematic diagram of the fluoranthene degradation rates measured by GC-MS.

NC means negative control without inoculation; PY97M and D15-8W are pure cultures of the PAHs-degrading strains.

DETAILED DESCRIPTION OF THE EMBODIMENTS

The method of the present invention will be described particularly as follows in combination with the embodiments.

I. Information of Bacterial Strains in one embodiment, the bacterial strains in the marine bacterial liquid are two strains of the OHCBs, wherein one is a bacterium of the genus of *Cycloclasticus* (*Cycloclasticus* sp. PY97M), the other is a bacterium of the genus of *Marinobacter* (*Marinobacter* sp. D15-8W). The two bacterial strains have been respectively deposited on Nov. 30, 2010, and Dec. 29, 2011, in China General Microbiological Culture Collection Center located at No. 1 West Beichen Road, Chaoyang District, Beijing 100101, China, and the deposition numbers are CGMCC No. 4339 (strain *Cycloclasticus* sp. PY97M) and CGMCC No. 5669 (strain *Marinobacter* sp. D15-8W), respectively.

1. Geographical Position Information of the Isolated Strains

Strain PY97M is isolated from the sediment of Yellow Sea of China (36.6661 N 121.9943 E); strain D15-8W is isolated from the sediment of South Sea of China (19.9770 N 111.4210 E).

2. The Process of Strain Isolation 2 g of sediment sample is added into 100 mL of phenanthrene-containing seawater medium (concentration of phenanthrene 0.2 g/L), and cultivated in a shaker under the conditions of 25° C., 150 r/min and in the absence of light for 1 month. The culture is transferred with the same medium 2 times, and cultivated for 2 weeks each time. The culture of the second transfer is diluted in 10-fold gradient with sterile seawater, and sprayed three continuously suitable gradients on M8 medium plates, which are inverted and cultivated at 25° C. Single colonies with different morphologic characteristics are picked-up and streaked on fresh M8 plates by sterile toothpick. The streaking is repeated to obtain pure cultures. The single colonies of pure cultures are picked-up and inoculated in an M8 liquid medium with toothpick, and incubated overnight at 25° C. to obtain the late-exponential-phase cultures of strain PY97M and D15-8W.

3. Physiological and Biochemical Character of Strains

Strain D15-8W is Gram-negative, catalase positive and oxidase positive bacterium. Its growth temperature range is 20° C.-35° C. (optimum 20° C.), growth concentration range of NaCl is 0%~15% (optimum 0.5%), growth pH range is pH5.5-pH9.9 (optimum pH5.5). The strain can use n-alkanes (e.g., n-undecane, n-tetradecane, n-hexadecane, n-heptadecane, n-octadecane, n-nonadecane, n-eicosane, n-docosane, n-tetracosane) as its growth carbon resource; and also can degrade polycyclic aromatic hydrocarbons (naphthalene, biphenyl, acenaphthylene, fluorene, dibenzofuran, phenanthrene, anthracene, dibenzothiophene), but cannot use 2-methylnaphthalene, pyrene and fluoranthene as its growth carbon resource.

Strain PY97M is Gram-negative bacterium. The strain can degrade at least 7 different kinds of PAHs, including naphthalene, 2-methylnaphthalene, 2,6-dimethynaphthalene, diphenyl, phenanthrene, pyrene, and fluoranthene. GC-MS is used to determine the degradation rates of phenanthrene, which is known as a typical PAH, and the result shows that the degradation rates of phenanthrene, which has an initial concentration of 0.2 g/L, can be 99% after 10 days.

II. The Above Strains are Used to Prepare Composite Marine Bacterial Liquid

Example 1

Process of Preparing the Composite Marine Bacterial Liquid for Synergically Degrading HMW PAHs (1) Seed liquid preparation 200 mL of sodium acetate medium is prepared for the cultivation of strain PY97M, and 200 mL of M8 medium is prepared for the cultivation of strain D15-8W. Each of the medium is inoculated with 200 μL low-temperature stored inoculum, strain PY97M in 200 mL of sodium acetate medium and strain D15-8W in 200 mL of M8 medium respectively, both strains are incubated in the dark with shaking (150 rpm) at 25° C. until late-exponential-phase to obtain active strains.

10 L of sodium acetate medium is prepared for the cultivation of strain PY97M, and 10 L of M8 medium is prepared for the cultivation of strain D15-8W. Each of the medium is inoculated with the two strains in a inoculum size of 2%, strain PY97M in 10 L of the sodium acetate medium and strain D15-8W in 10 L of the M8 medium. Both strains are incubated in the dark with shaking (150 rpm) at 25° C. until late-exponential-phase to prepare the seed liquid.

(2) Fermentation of the bacterial liquid

200 L of sodium acetate medium is prepared for the fermentation of strain PY97M, and 200 L of M8 medium is prepared for the fermentation of strain D15-8W. The strains are inoculated in the sodium acetate medium or M8 medium separately at an inoculation size of 5%, strain PY97M in 200 L of the sodium acetate medium and strain D15-8W in 200 L of the M8 medium. The fermentation conditions are as follows: air flow rate of 0.30 $m^3$/h, blade agitating speed of 150 rpm, and fermentation temperature of 25° C. To increase the yield of fermentation, defoaming is performed by flowing addition of bean oil and the process is controlled by defoaming electrode. The cell concentration is $10^8$-$10^9$ CFU/mL at the end of the fermentation.

(3) After the cultivation in fermenter, the two marine bacterial cultures are homogeneously mixed to prepare 400 L of composite marine bacterial liquid for HMW PAHs degradation. In the composite marine bacterial liquid, the cell concentration of either PY97M or D15-8W is $10^7$-$10^9$ CFU/mL, 5-fold concentrated liquid of composite marine bacterial culture for HMW PAHs degradation is prepared by centrifuging at 8000 rpm for 15 min with high capacity 4° C. refrigerated centrifuge to ease the transition and application.

(4) Storage of the above composite marine bacterial liquid at 4° C.

The method for analyzing the HMW PAHs degradation efficiency is as follows:

(1) Preparing a medium for analyzing the HMW PAHs degradation efficiency: each liter of the medium comprises 22.79 g NaCl, 11.18 g $MgCl_2.6H_2O$, 3.98 g $Na_2SO_4$, 1.46 g $CaCl_2.2H_2O$, 1.30 g TAPSO, 0.72 g KCl, 0.27 g $NH_4Cl$, 89.00 mg $Na_2HPO_4.7H_2O$, 83.00 mg NaBr, 31.00 mg $NaHCO_3$, 27.00 mg $H_3BO_3$, 24.00 mg $SrCl_2.6H_2O$, 2.60 mg NaF, 2.00 mg $FeCl_2.4H_2O$, and 20 mg fluoranthene or pyrene. The pH value of the medium is 7.6.

(2) HMW PAHs degradation assay: a bacterial liquid of pure cultures of strain PY97M and D15-8W, and a composite marine bacterial liquid are separately cultivated in 100 mL of medium, which contain fluoranthene or pyrene, at a proportion of 2%. The treatment without inoculum is used as negative control. Each of the treatment is conducted in triplicate. All the above cultures are incubated in dark with shaking (150 rpm) at 20° C. for 3 weeks. The analyzing and comparison of HMW PAHs degradation rates of pure cultures and composite marine bacterial liquid are performed with GC-MS.

(3) Pretreatment of samples: After degradation, bacterial cells in samples and control are removed by centrifuging at 10000 rpm for 10 minutes. Accurately measured 50 mL of n-hexane is added into the sample and the residual HMW PAHs are extracted from it. 2 mL of solution is accurately measured and obtained in the phase of n-hexane. The solution is dehydrated with anhydrous $Na_2SO_4$ and filtrated by using 0.22 μm organic solvent-resistant filter. Then, the filtrate is moved into a GC vial and its volume is measured. This solution is used for the determination of residual HMW PAHs by using GC-MS.

(4) Gas chromatogram (Agilent HP7890 Plus); Mass spectrometric detection device (Agilent HP5975); Chromatographic column is HP-5MS (30 m×0.25 mm×0.25 μm) capillary column; Temperature of injunction port: 280° C.; Temperature of ion source: 230° C. The carrier gas is helium (99.999%), with the velocity of 1 mL/min. Temperature program comprises: starting at 70° C., rising to 150° C. at a speed of 20° C./min, keeping at 150° C. for 2 min, rising to 300° C. at a speed of 7° C./min, and keeping at 300° C. for 2 min. Scanning mode: SIM mode; Selecting ion: m/z 202. Sample injection: HP7683 automatic sampler, splitless injection 1 μL. Data Acquisition and Process: HP3365 Chemical workstation.

Figure 2:
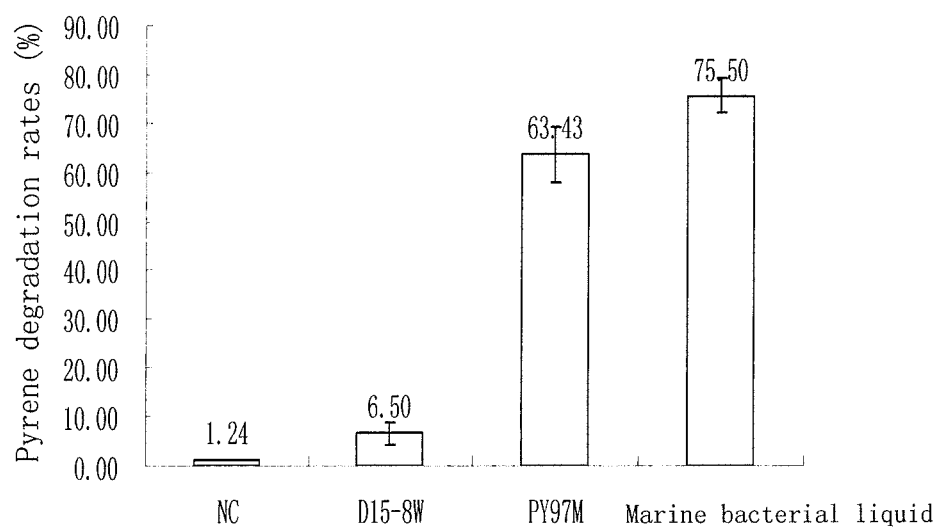
FIG. 2 is a comparison schematic diagram of the pyrene degradation rates measured by GC-MS.

The experiment results are as follow:

The residual amount of fluoranthene or pyrene in cultural medium after biodegradation is measured by GC-MS, and the degradation rates are calculated respectively. As shown in FIG. 1, compared with the treatment of pure culture of strain PY97M (65.21%) and D15-8W (3.09%), the treatment of composite marine bacterial liquid exhibited higher fluoranthene-degradation rates (83.03%). As shown in FIG. 2, compared to the treatment of pure culture of strain PY97M (63.43%) and D15-8W (6.50%), the treatment of composite marine bacterial liquid exhibited higher pyrene-degradation rates (75.50%).

In conclusion, the composite marine bacterial liquid synergically degrading HMW PAHs is particularly used in the bioremediation of the coast line or tidal flat which is polluted by POPs such as HMW PAHs.

Example 2

An explosion accident took place at the oilery of Xingang Wharf in Dalian on Jul. 16, 2010, and at least 50 square kilometers maritime space was polluted by the great quantity of crude oil which was spilled from the oilcan. Although the cleanup was almost completed in two weeks after the accident, there were still much oil stain which hadn't been cleared from the beach, which made a serious risk to the local marine ecological environment. Gas chromatographic analysis result of the sample of spillage showed that, although the crude oil had started to weather, the components with higher molecular weight were weathered in a much lower degree, particularly, the HMW PAHs which had carcinogenesis were substantially not degraded.

The process of biodegradation of the crude oil which has a high content of HMW PAHs and reduction of ecological toxicity could be promoted only when the composite bacterial liquid, which has high performance on the HMW PAHs degradation, is added. The detail is as follows:

(1) Seed liquid preparation 200 mL of sodium acetate medium is prepared for the cultivation of strain PY97M, and 200 mL of M8 medium is prepared for the cultivation of strain D15-8W. Each of the medium is inoculated with 200 μL low-temperature stored inoculum, strain PY97M in 200 mL of the sodium acetate medium and strain D15-8W in 200 mL of the M8 medium. Both strains are incubated in the dark with shaking (150 rpm) at 25° C. until late-exponential-phase to obtain active cells.

10 L of sodium acetate medium is prepared for the cultivation of strain PY97M, and 10 L of M8 medium is prepared for the cultivation of strain D15-8W. Each of the medium is inoculated with the two strains in an inoculum size of 2%, strain PY97M in 10 L of sodium acetate medium and strain D15-8 W in 10 L of M8 medium. Both strains are incubated in the dark with shaking (150 rpm) at 25° C. until late-exponential-phase to prepare the seed liquid.

(2) Fermentation of the bacterial liquid

200 L of sodium acetate medium is prepared for the fermentation of strain PY97M, and 200 L of M8 medium is prepared for the fermentation of strain D15-8W. The strains are inoculated in the sodium acetate medium or M8 medium separately at an inoculation size of 5%, strain PY97M in 200 L of sodium acetate medium and strain D15-8W in 200 L of M8 medium. The fermentation conditions are as follows: air flow rate of 0.30 $m^3$/h, blade agitating speed of 150 rpm, and fermentation temperature of 25° C. To increase the yield of fermentation, defoaming is performed by flowing addition of bean oil and the process is controlled by defoaming electrode. The cell concentration is $10^8$-$10^9$ CFU/mL at the end of the fermentation.

(3) After the cultivation in a fermenter, the two marine bacterial cultures are homogeneously mixed to prepare 400 L of a composite marine bacterial liquid for HMW PAHs-degradation. In the composite marine bacterial liquid, the cell concentration of either PY97M or D15-8W is $10^7$-$10^9$ CFU/mL. 80 L of 5-fold concentrated liquid of the composite marine bacterial culture for HMW PAHs degradation is prepared by centrifuging at 8000 rpm for 15 min with high capacity 4° C. refrigerated centrifuge to ease the transition and application.

(4) Storage of the above composite marine bacterial liquid at 4° C.

(5) Spraying the composite marine bacterial liquid and nutritional salt

The bioremediation was performed at a cobblestone beach (the maritime space around which was for breed aquatics so chemical oil dispersants were forbidden to be used.) of Dalianwan bay which was polluted by the oil spill. The experiment area was about 100 $m^2$ (2 L to 10 L of the composite marine bacterial liquid was sprayed per square meter at the beach which was polluted by the spilled oil.). After the fall of tide of everyday, the composite marine bacterial liquid was sprayed on to the surface of the oil stained cobblestone at the tidal zone or supratidal zone of the beach by a spraying gun, and the nutritional salt solution which contains nitrogen and phosphorous was sprayed on the same area by a sprinkler, then a certain dosage of slow-release fertile was applied. The period of bioremediation lasted for two months, the frequency of the spraying was once for every week in the first month, and once for every two weeks in the second month, and each time the spraying work continued for two days.

(6) Sampling and the evaluation of the bioremediation effect

To determine the effect of the bioremediation, beach cobblestone was collected and analyzed by GC-MS. The sampling was performed after each bioremediation treatment. The sample of the beach cobblestone was collected, wrapped up by foil and conserved at a low temperature. After the pretreatment, the oil stain remained in the cobblestone sample was extracted. The component of petroleum hydrocarbons such as HMW PAHs changing with time was determined by GC-MS to evaluate the bioremediation effect of the composite marine bacteria liquid. After the two months of bioremediation treatment, the treatment of composite marine bacterial liquid was anticipated to get a 20.00%-60.00% increased degradation rate of HMW PAHs including pyrene and fluoranthene compared to that of natural weathering treatment.

The result showed that the bacterial strain and the composite marine bacterial liquid had high performance in degrading HMW PAHs.

The invention claimed is:

1. A biologically pure bacterial strain of *Cycloclasticus* sp., whose deposition number is CGMCC No. 4339.

2. A biologically pure bacterial strain of *Marinobacter* sp., whose deposition number is CGMCC No. 5669.

3. A composite bacterial liquid, comprising alive bacteria of a biologically pure bacterial strain of *Cycloclasticus* sp., whose deposition number is CGMCC No. 4339, and of a biologically pure bacterial strain of *Marinobacter* sp., whose deposition number is CGMCC No. 5669.

4. The composite bacterial liquid according to claim 3, wherein the cell concentration of the bacteria is $10^7$-$10^9$ CFU/mL.

5. The composite bacterial liquid according to claim 3, wherein the bacterial liquid is prepared in a sodium acetate medium or M8 medium, wherein each liter of the sodium acetate medium comprises 22.79 g NaCl, 11.18 g $MgCl_2.6H_2O$, 3.98 g $Na_2SO_4$, 1.46 g $CaCl_2.2H_2O$, 1.30 g TAPSO, 0.72 g KCl, 0.27 g $NH_4Cl$, 89.00 mg $Na_2HPO_4.7H_2O$, 83.00 mg NaBr, 31.00 mg $NaHCO_3$, 27.00 mg $H_3BO_3$, 24.00 mg $SrCl_2.6H_2O$, 2.60 mg NaF, 2.00 mg $FeCl_2.4H_2O$, and 2 g sodium acetate; and wherein a pH value of the medium is 7.6, and wherein each liter of the M8 medium comprises 22.79 g NaCl, 11.18 g $MgCl_2.6H_2O$, 3.98 g $Na_2SO_4$, 1.46 g $CaCl_22H_2O$, 1.30 g TAPSO, 0.72 g KCl, 0.27 g $NH_4Cl$, 89.00 mg $Na_2HPO_4.7H_2O$, 83.00 mg NaBr, 31.00 mg $NaHCO_3$, 27.00 mg $H_3BO_3$, 24.00 mg $SrCl_2.6H_2O$, 2.60 mg NaF, 2.00 mg $FeCl_2.4H_2O$, 2 g sodium acetate, 0.5 g peptone, 0.5 g yeast extracts, 0.5 g potato extract powder, 0.2 g glucose, 0.2 g sucrose, 0.05 g sodium malate, 0.05 g trisodium citrate, and 0.05 g potassium sodium tartrate; and wherein a pH value of the medium is 7.8.

* * * * *